(12) United States Patent
Kubala

(10) Patent No.: US 7,229,102 B2
(45) Date of Patent: Jun. 12, 2007

(54) FLUID COOLANT UNION

(75) Inventor: Zbigniew Kubala, Beach Park, IL (US)

(73) Assignee: Deublin Company, Waukegan, IL (US)

( * ) Notice: Subject to any disclaimer, the term of this patent is extended or adjusted under 35 U.S.C. 154(b) by 17 days.

(21) Appl. No.: 10/732,759

(22) Filed: Dec. 10, 2003

(65) Prior Publication Data

US 2004/0119280 A1      Jun. 24, 2004

Related U.S. Application Data

(60) Provisional application No. 60/435,890, filed on Dec. 20, 2002.

(51) Int. Cl.
*F16L 17/035*   (2006.01)
*F16L 27/00*    (2006.01)
*F16J 15/18*    (2006.01)

(52) U.S. Cl. .................. 285/98; 285/111; 285/113; 285/281; 277/530; 277/531

(58) Field of Classification Search .................. 285/95, 285/98, 111, 113, 281, 351, 918; 277/530, 277/531, 567, 584

See application file for complete search history.

(56) References Cited

U.S. PATENT DOCUMENTS

| | | | | | |
|---|---|---|---|---|---|
| 2,420,104 | A | * | 5/1947 | Smith | 277/453 |
| 2,723,136 | A | * | 11/1955 | Deubler et al. | 285/110 |
| 3,405,959 | A | * | 10/1968 | Walker | 285/276 |
| 3,455,566 | A | * | 7/1969 | Hull et al. | 277/582 |
| 3,765,690 | A | * | 10/1973 | Sievenpiper | 277/556 |
| 4,201,392 | A | * | 5/1980 | Watts | 277/558 |
| 4,281,839 | A | * | 8/1981 | Schoenmeyr | 277/379 |
| 4,296,952 | A | * | 10/1981 | McCracken | 285/98 |
| 4,626,003 | A | * | 12/1986 | Williams et al. | 285/98 |
| 4,681,327 | A | * | 7/1987 | d'Agostino et al. | 277/587 |
| 4,817,995 | A | * | 4/1989 | Deubler et al. | 285/98 |
| 4,893,823 | A | * | 1/1990 | Strouse et al. | 277/437 |
| 4,976,282 | A | * | 12/1990 | Kubala | 137/580 |
| 5,071,318 | A | * | 12/1991 | Bice et al. | 415/230 |
| 5,174,614 | A | * | 12/1992 | Kaleniecki | 285/279 |
| 5,269,537 | A | * | 12/1993 | Kiesel | 277/554 |
| 5,577,775 | A | * | 11/1996 | Pearson et al. | 285/24 |
| 5,617,879 | A | * | 4/1997 | Kubala | 285/95 |
| 5,669,636 | A | * | 9/1997 | Kubala | 285/98 |
| 6,406,065 | B1 | * | 6/2002 | Ott et al. | 285/120.1 |
| 6,709,025 | B2 | * | 3/2004 | Spring | 285/272 |

FOREIGN PATENT DOCUMENTS

GB      923 013 A      4/1963

* cited by examiner

*Primary Examiner*—James M. Hewitt
(74) *Attorney, Agent, or Firm*—Amin Hallihan LLC

(57) ABSTRACT

A coolant union includes a seal assembly having a first seal member and a non-rotating second seal member. At least one of the annular sealing surfaces presented by the rotating seal member and the non-rotating seal member is chamfered such that the chamfered sealing surface presents a sealing surface width less than the width of the dimension of the other sealing surface. The fluid coolant union further includes a U-shaped annular secondary seal member having a chamfered portion structurally arranged to receive a triangular back-up ring which stores sufficient relative displacement of the floating seal assembly to create a separation between the first rotating seal and the second non-rotating seal members during the unpressurized condition.

4 Claims, 4 Drawing Sheets

FLUID COOLANT UNION

CROSS-REFERENCE TO RELATED PATENT APPLICATIONS

This application claims priority to provisional patent application No. 60/435,890, filed on Dec. 20, 2002.

BACKGROUND OF THE INVENTION

The present invention relates to a fluid coupling union such as a fluid coolant rotating union having a secondary sealing assembly which provides a depressurized condition displacement of the floating seal members from one another to provide a pop-off or gap between the seal members when the cooling union is depressurized.

Fluid coolant unions are used extensively in conjunction with machine tools in various high speed drilling and boring transfer operations, high speed machine tool spindles, and in various applications such as machining centers and flexible transfer lines. In such applications, the rotating union is structurally arranged to conduct various types of coolants, such as water-based, oil-based, and air-based fluids into the machine tool spindle. Preferably, such coolants may be used without prolonged dry-run periods of operation of the coolant union. Coolant unions generally include conventional seal assemblies having a rotating seal member mounted to the end of the rotating rotor member, which seal member is axially aligned to engage a non-rotating complementary seal member which is mounted to an axially movable carrier member mounted within the housing.

In existing prior art coolant union assemblies, when the union is operating in the pressurized condition the sealing surface of the non-rotating seal member is biased into engagement with the sealing surface of the rotating seal member by overcoming some type of spring or baffle diaphragm bias means which is designed to axially separate the seal members when in the non-pressurized dry-running condition. As the liquid or fluid coolant is passed through the coolant union, the coolant lubricates the contacting seal members to minimize wear between the members. When the condition is reached where the union is unpressurized and fluid coolant is not passing through the union, a "dry running" condition is achieved and the facing surfaces of the rotating and non-rotating seal members do not receive any lubrication. During this dry-running condition, the increased wear on the seal facings results in leakage about the seal facings which ultimately require replacement of one or both of the seal members. Such replacement of the seal facing and the rotor assembly are expensive and time consuming.

To overcome the problems associated with dry-running, coolant unions have been developed to include structure which separates the rotating and non-rotating seal facings from one another when fluid coolant is not passing through the union. Such "pop-off" type unions may be biased by spring or diaphragm members. Such biasing members position the seal members apart from one another in the absence of the passage of fluid coolant passing through the union. However, such coolant unions are complex and expensive to manufacture. Also, during start-up of such coolant unions, excessive amounts of the fluid coolant are permitted to pass through the enlarged gap separating the rotating and non-rotating seal facings.

SUMMARY OF THE INVENTION

The present invention provides a novel fluid coolant union which utilizes chamfered seal faces on at least one of the non-rotating and rotating portion floating seal assembly facings of the coolant union. Such coolant unions permit the handling of multiple cooling media, such as water-based, oil-based, air-oil mist based and air-based coolants to be directed through the coolant union. Additionally, it has been determined that by chamfering the seal faces in accordance with the present invention, the handling of the multiple media with a single seal balance is permitted while controlling leakage for the water-based, the oil-based, the air-oil mist and the air-based media to minimum levels. The chamfered seal face of at least one of the floating seal assembly facings additionally permits the use in the seal faces of special silicon carbide based materials containing specific and various porous type structures that may contain known lubricants such as graphite to provide a self-lubricating property to the seal faces. By utilizing chamfered seal faces, the seal faces may contain a specific combination of silicon carbide based materials which provide different porous structures with respect to the coolant media when operating in a dry run condition. Thus, by utilizing chamfered seal faces, it has been found that the PV (pressure× sliding velocity) limit of such specialized seal facing provides an increase in operating life for such seal facings as compared to the situation when the seal facings are not chamfered.

In accordance with a further embodiment of the present invention, the coolant union includes a secondary sealing assembly. The secondary sealing assembly provides a sealing arrangement for the union to prevent leakage forward between the floating seal assembly of the coolant union and the carrier member that are adapted for axial sliding movement within the passageway in the housing. This secondary sealing arrangement or assembly includes an annular groove radially extending around the inside surface of the union housing, with the annular groove containing an annular seal member. Preferably, the annular seal member is a U-shaped seal member. This U-shaped seal member is positioned within the annular groove and includes an inside corner thereof chamfered. The U-shaped seal member is then chamfered and sized to structurally cooperate with a triangular shaped back-up ring configured and sized to provide the unfilled volume within the annular groove which, when pressurized, stores sufficient relative displacement of the floating seal faces from one another to create a micro pop-off or a minute separation of the seal faces when depressurization occurs.

The radial interference fit between the chamfered U-shaped annular seal member, the enclosing housing and the floating seal is less that standard to provide for the necessary interaction of the U-shaped seal member and the floating seal to create a micro pop-off between the rotating and the floating seal facings. This is accomplished by chamfering the inside corner of the U-shaped seal member to a size in relation to the dimension of the triangular plastic back-up ring to provide an unfilled volume and permit freedom of movement of the U-shaped secondary seal member. The unfilled volume, when pressurized, stores sufficient relative displacement of the floating seal members with respect to one another to create the pop-off or separation of the seal faces. This separation or gap between the seal faces is very small.

The triangular back-up ring is comprised of a selected plastic material which provides a necessary combination with the chamfered U-shaped seal member. By sizing the back-up ring to the unfilled volume of the chamfered U-shaped seal member, the chamfered U-shaped seal member and back-up ring provides the freedom of movement for the long term functioning of the secondary seal assembly without hang-up while permitting the adjustability of the position of the floating seal for variable axial locations of the rotor. The resultant fluid coupling union is simpler in construction because it does not require a spring-biased member or baffle member to provide separation of the floating seal faces and to provide contact of the seal faces during pressurization.

The present invention consists of certain novel features and structural details hereinafter fully described, illustrated in the accompanying drawings, and particularly pointed out in the appended claims, it being understood that various changes in the details may be made without departing from the spirit or sacrificing any of the advantages of the present invention.

DESCRIPTION OF THE DRAWINGS

For the purpose of facilitating and understanding the present invention, there is illustrated in the accompanying drawings a preferred embodiment thereof, from an inspection of which, when considered in connection with the following description, the invention and its construction and operation and many of its advantages will be readily understood and appreciated.

DESCRIPTION OF THE PREFERRED EMBODIMENT

Figure 1:
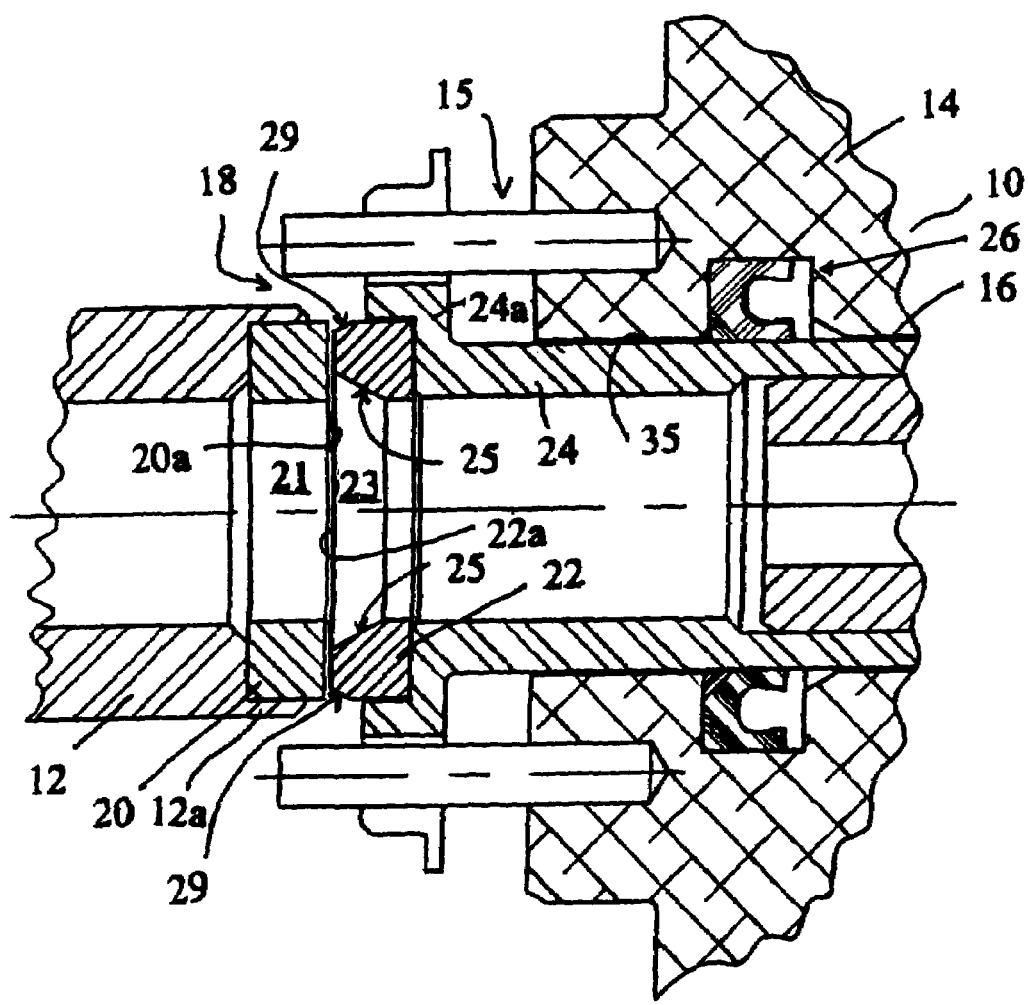
FIG. 1 is a vertical section view of the fluid coolant union provided in accordance with the present invention, with the coolant union shown in its unoperated, unpressurized condition.
Figure 2:
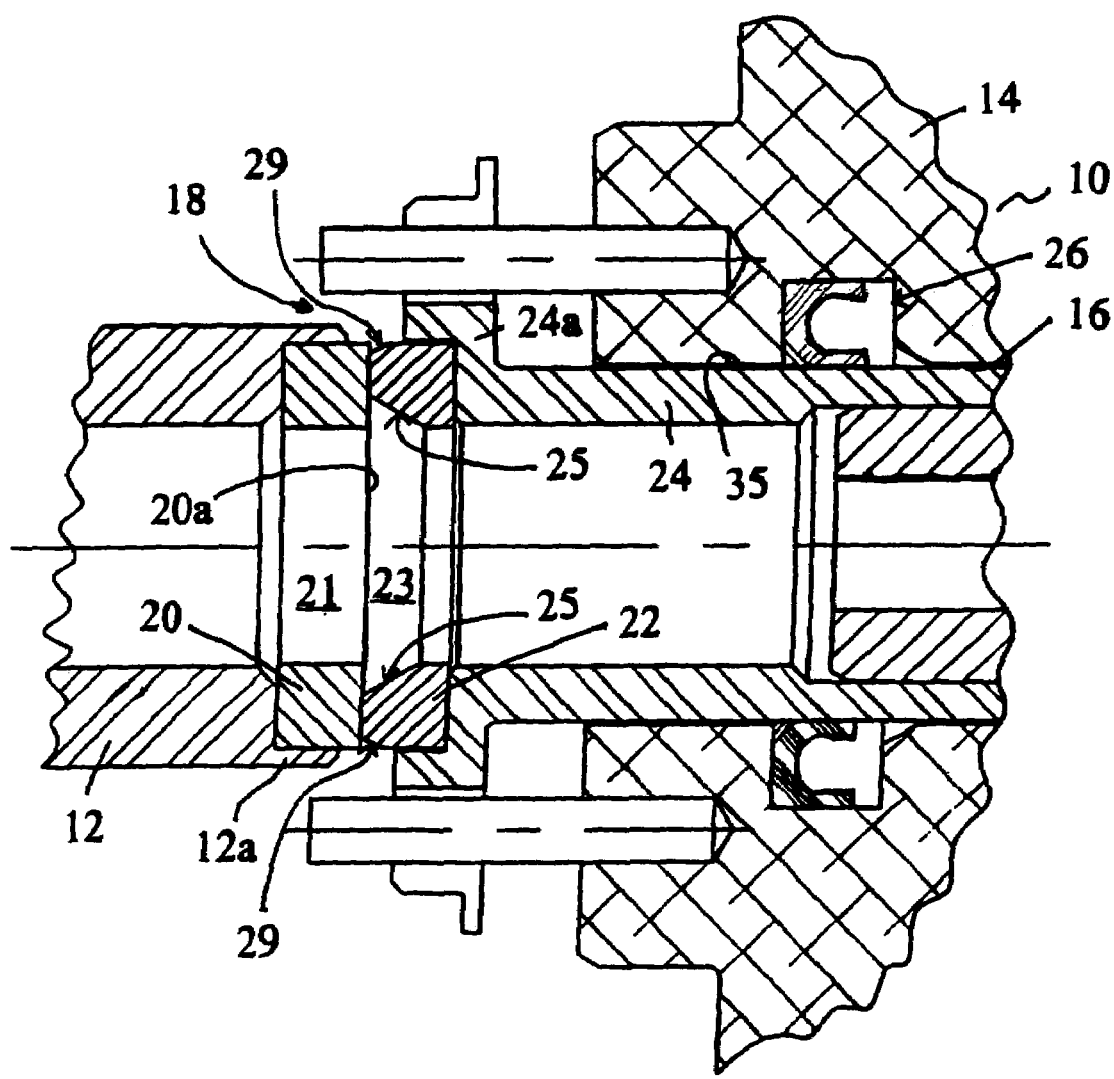
FIG. 2 is a view similar to FIG. 1 showing the fluid coolant union in its operated, pressurized condition in accordance with the present invention.

Referring now to the drawings wherein like numerals have been used throughout the several views to designate the same or similar parts, there is illustrated in the drawings a rotating fluid coolant union 10 incorporating the novel sealing arrangement in accordance with the present invention. The fluid coolant union 10, as shown in FIGS. 1 and 2, is utilized to conduct a fluid coolant either in a liquid or gaseous state from a source of coolant (not shown) to a spindle of a machine tool and the like. The spindle could be a machine tool used in the various applications such as machining centers, flexible transfer lines or any environment where fluid coolants such as water-based, oil-based, air-oil mist based and air-based coolants may be used in conjunction with the fluid coolant union 10.

The fluid coolant union 10 is comprised of a rotor or shaft member 12, coupled to an end cap or housing member 14. The end cap or housing 14 provides a cylindrical housing for the fluid coolant union with the housing identified as reference numeral 14. The cylindrical bore 16 of the housing 14 defines a seal chamber 15 which locates the seal assembly 18 within the coolant union 10.

As shown in FIGS. 1 and 2, the seal assembly 18 is comprised of a rotating seal member 20 which is mounted to the end 12a of the stub rotor member 12 and a non-rotating seal member 22 mounted to the end of a carrier member 24. The rotating seal member 20 is, preferably, a disc-shaped, one-piece silicon carbide member which provides a generally flat-shaped annular seal surface 20a about an opening 21 through the center thereof. The non-rotating seal member 22 of the seal assembly 18 is also a generally flat disc-shaped member that is also, preferably, comprised of silicon carbide. The seal members 20 and 22 of seal assembly 18 may be comprised of various silicon carbide grades. The non-rotating seal member 22 includes an opening 23 therethrough and includes an annular seal surface 22a. The non-rotating seal member 22 is mounted to an end 24a of a carrier member 24 which is axially movable within the cylindrical bore 16 of housing member 14.

Importantly, one of the annular seal surfaces 20a and 22a is chamfered to present a narrowed and reduced annular contact seal facing between the floating seal assemblies. It is preferred that the non-rotating seal face surface 22a is the seal surface that is chamfered. The chamfered portion is shown as beveled portions 25 and 29 in FIGS. 1 and 2. The mating between seal surfaces 20a and 22a permits the handling of multiple media, such as water-based, oil-based, air-oil mist based and air-based fluid materials to be used without prolonged dry run conditions. As shown in FIGS. 1 and 2, it has been found that when the width of the annular seal surface 22a of the seal assembly 18 is narrower than the width of the rotating annular seal surface 20a then the seal assembly 18 is more capable of operating in an unpressurized running dry run condition without significant damage to the seal members 20 and 22.

Figure 3:
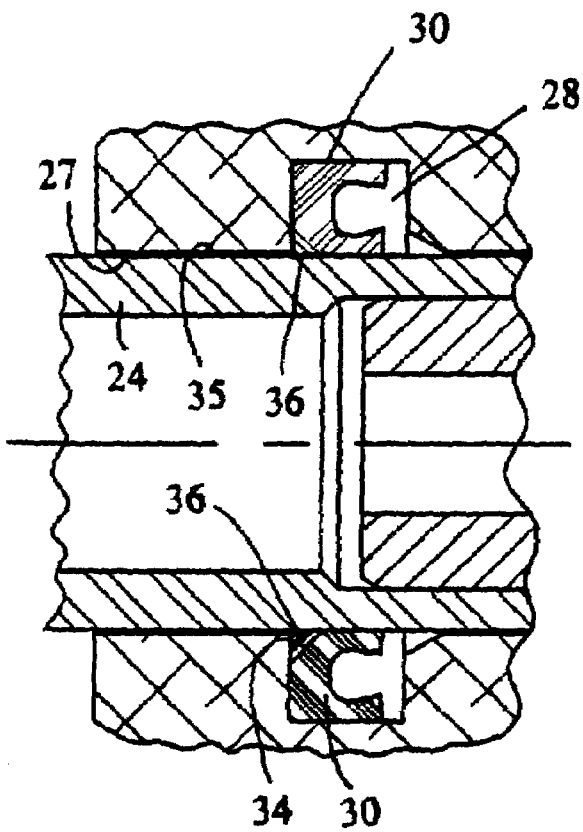
FIG. 3 is an enlarged view of the portion of the secondary seal assembly in accordance with the present invention when the coolant union is in the unoperated, unpressurized condition.
Figure 4:
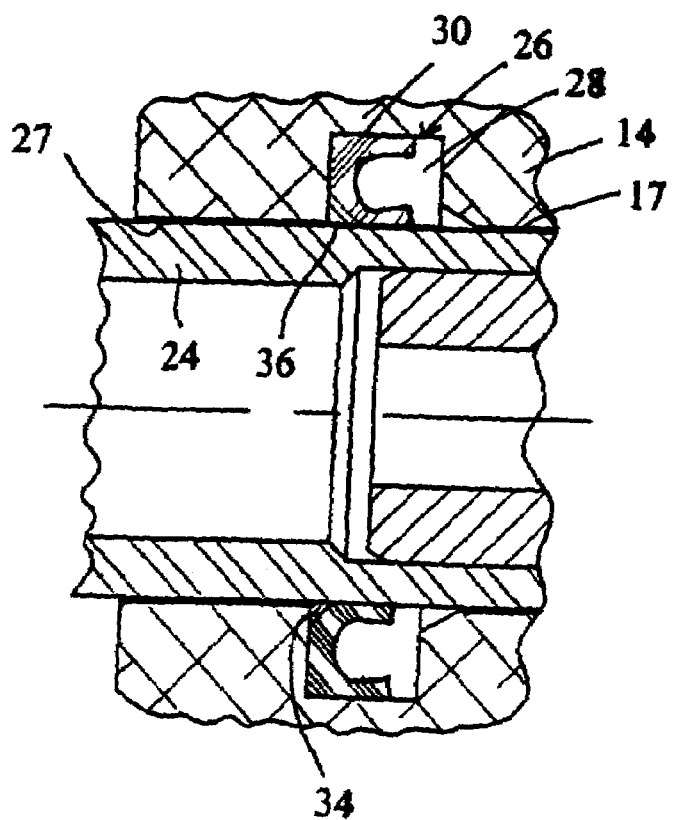
FIG. 4 is an enlarged view of the portion of the secondary seal assembly in accordance with the present invention with the coolant union shown in the operated, pressurized condition.
Figure 5:
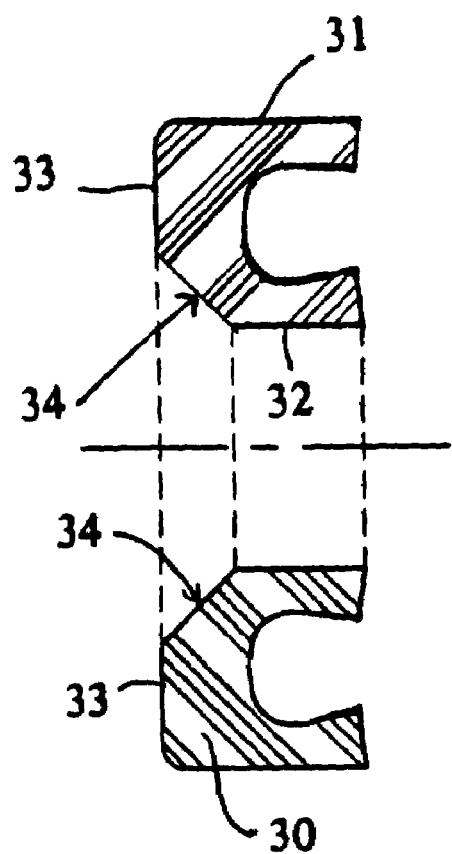
FIG. 5 is a schematic cross-sectional view illustrating the chamfered U-shaped secondary annular seal member in accordance with the present invention.

The fluid coolant union 10 in accordance with the present invention further includes a secondary seal assembly 26 to prevent leakage of the fluid coolant forwardly of the carrier 24 through the gap 27 between the outer surface of the carrier side wall 35 and the inner surface 17 of the cylindrical bore 16 of the housing member 14. The secondary seal assembly 26 is comprised of a U-shaped annular sealing member 30 positioned within an annular groove 28 positioned within the inner surface 17 of the housing member 14 that engages the inner surface 17 of the housing member 14 and the outer surface 35 of the carrier member 24. The U-shaped annular sealing member 30 of the secondary seal assembly 26, as shown in FIGS. 3, 4 and 5 is a modified U-shaped type annular seal. As shown in FIG. 3, the U-shaped annular seal member 30 is positioned within the annular groove 28 within the housing member 14. When the U-shaped seal member 30 is positioned within the annular groove, the lip members 31 and 32 and the foot connection member 33 (FIG. 5) of the annular seal substantially contact the inner and outer surfaces of the annular groove as well as the front surface or the side of the groove opposite the high pressure area, as shown in FIGS. 1 and 3. As shown in FIG. 5, the U-shaped seal member is comprised of an elastomer type material and includes a chamfered diagonal cut 34 on the foot portion of the seal assembly 30 that is positioned toward the outer surface 35 between the carrier 24 and the cylindrical bore 16 of the housing member 14. This chamfered cut is sized in relation to a triangular back-up ring 36 to structurally cooperate with the triangular back-up ring 36 (FIG. 6) to provide an unfilled volume which, when pressurized, stores sufficient relative displacement energy (FIG. 4) to the floating seal assembly to create a micro pop-off or separation of the seal faces 20a and 22a when the coolant union is depressurized, the condition as shown in FIG. 1.

Figure 6:
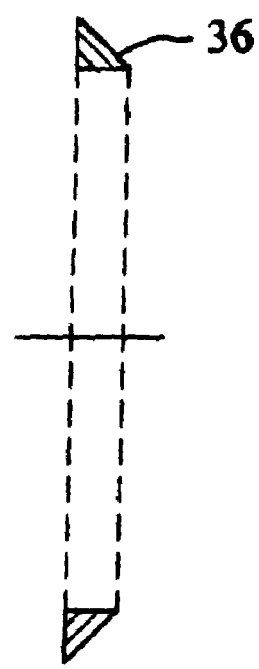
FIG. 6 is a schematic cross-sectional view of the triangular back-up ring member of the secondary seal assembly in accordance with the present invention.

FIG. 6 represents a cross-section of the annular back-up ring 36 which is comprised of polymer material. This particular specialized plastic material provides a back-up ring that controls the absorption of moisture and controls the hardness of the material as well as controls the machineability of the back-up ring to permit the back-up ring 36 to be structurally arranged to occupy the space and volume within the chamfer cut in the inner wall of the U-shaped annular seal.

During the operation of the coolant union 10 in the pressurized operating condition, the U-shaped secondary seal member 30 engages the annular back-up ring 36 to prevent the extrusion of the secondary seal into the gap. Because of the precise control of the gap distance between the floating seal assembly and the rotor assembly, a reduced amount of fluid coolant is permitted to pass between the annular seal surfaces 20a and 22a of the rotating and non-rotating seal members. The gap between the seal members when the coolant union 10 is in the unpressurized, unoperable condition is minimized and substantially limited because of the pull-back action on the non-rotating seal member during depressurization of the union. Thus, the secondary seal assembly provides a sealing function as well as a separation function of the floating seal assembly. Because the gap is minimized in the unpressurized condition, a minimum amount of coolant is permitted to pass between this reduced gap during start up of the coolant union. The reduced amount of fluid coolant to pass between the annular seal surfaces 20a and 22a results in a cleaner operating and more efficient fluid coolant union.

Additionally, the radial interference fit between the chamfered U-shaped annular seal 30 and the annular groove 28 within the housing member 14 permits the adjustable setting of the gap between the annular seal faces 20a and 22a. This is because the interference fit is less than standard such that upon pressurization of the union, the chamfer on the annular seal 30 and the back-up ring provide a sufficient interaction or displacement energy to create the micro pop-off of separation when the union is depressurized. This permits the adjustment of the floating seal assembly 24 for variable axial locations of the stub rotor member 12 and permits the predetermined relocation and adjustment of the floating seal assembly 24.

While the invention is described with reference to a preferred embodiment, various modifications may be made without departing from the spirit and scope of invention as defined in the appended claims. For example, although the sealing arrangement is described with reference to a stub rotor member 12, the stub rotor assembly may be contemplated to be a bearingless stub rotor member or may be a rotor assembly that is confined within fixed bearing structures. This permits the present invention to provide a wide range of operation through a coolant union from hundreds of RPMs to in excess of 40,000 RPMs.

The invention claimed is:

1. A coolant union having a primary seal assembly and a tubular carrier member axially movable within a union housing having a wall defining a cylindrical inner chamber and having an annular groove within the union housing, with the carrier member adapted to receive fluid coolant and structurally arranged to direct the coolant through the union to an associated tubular rotor, with the rotor having a sealing member thereon and the axially movable tubular carrier member having a sealing member thereon, with the carrier member axially movable between a pressurized position wherein the sealing members are in contact and an unpressurized position wherein said sealing members are spaced apart from each other, with the coolant union having a secondary seal assembly including in combination:
  a U-shaped seal member positioned in the annular groove within the housing and structurally arranged to provide a seal between the carrier member and the cylindrical inner chamber of the housing when the coolant union is in the operating pressurized position; and
  wherein said U-shaped seal member includes a chamfered portion structurally arranged to cooperate with a back-up ring member to provide an unfilled volume therebetween defined by said chamfered portion to create a micro-popoff and to prevent dry-running of said primary seal assembly when the union is operating in the unpressurized position.

2. The coolant union in accordance with claim 1, wherein said back-up ring is triangular shaped and includes a surface which is structurally arranged to cooperate with said chamfered portion on said U-shaped seal member.

3. The coolant union in accordance with claim 1, wherein the annular sealing surface of the sealing member mounted to the carrier member is chamfered.

4. The coolant union in accordance with claim 3, wherein the width of a sealing surface of the sealing member mounted to the carrier member provides a sealing surface of approximately one-half the width of a sealing surface of the sealing member on the rotor.

* * * * *